(12) United States Patent
Nozaki et al.

(10) Patent No.: US 8,613,465 B2
(45) Date of Patent: Dec. 24, 2013

(54) SIDE AIRBAG DEVICE

(75) Inventors: Hiroyuki Nozaki, Wako (JP); Makoto Nagai, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 109 days.

(21) Appl. No.: 13/133,544

(22) PCT Filed: Dec. 28, 2009

(86) PCT No.: PCT/JP2009/071773
§ 371 (c)(1),
(2), (4) Date: Jun. 8, 2011

(87) PCT Pub. No.: WO2010/076881
PCT Pub. Date: Jul. 8, 2010

(65) Prior Publication Data
US 2011/0241322 A1 Oct. 6, 2011

(30) Foreign Application Priority Data
Dec. 29, 2008 (JP) .................................. 2008-335636

(51) Int. Cl.
- B60R 21/207 (2006.01)
- B60R 21/233 (2006.01)
- B60R 21/2342 (2011.01)
- B60R 21/239 (2006.01)

(52) U.S. Cl.
USPC ......... 280/730.2; 280/739; 280/729; 280/742

(58) Field of Classification Search
USPC ............................... 280/739, 729, 730.2, 742
IPC ............ B60R 21/207,21/233, 21/2342, 21/239, B60R 21/231
See application file for complete search history.

(56) References Cited

U.S. PATENT DOCUMENTS 6,916,039 B2 * 7/2005 Abe .............................. 280/729
7,661,702 B2 * 2/2010 Ochiai et al. ............... 280/730.2
(Continued)

FOREIGN PATENT DOCUMENTS

DE           19832981 A1 * 1/1999
DE       202006023272    * 11/2007
(Continued)

OTHER PUBLICATIONS

English translation of JP 2000-255369.*
(Continued)

*Primary Examiner* — Keith Frisby
(74) *Attorney, Agent, or Firm* — Rankin, Hill & Clark LLP

(57) ABSTRACT

A side airbag device for a side collision is provided in which a first bag half body (20) on an occupant side and a second bag half body (21) on a door side are formed by sandwiching a third base fabric (19) between a first base fabric (17) on the occupant side and a second base fabric (18) on the door side, and gas supplied from an inflator (22) to the second bag half body (21) is supplied to the first bag half body (20) via a through hole (19a) formed in an end part of the third base fabric (19) that is on the side distant from the inflator (22), and therefore, after the second bag half body (21) is firstly deployed to ensure that there is the minimum necessary occupant restraint performance, the first airbag half body (20) is deployed, thereby sufficiently enhancing occupant restraint performance. When the second airbag half body (21) is deployed, due to the thickness thereof in the vehicle width direction being small, smooth deployment is possible without interfering with the occupant, and subsequently when deployment of the first airbag half body (20) is completed it is possible to protect the occupant effectively by ensuring that the thickness in the vehicle width direction of the entire airbag (16) is sufficient.

6 Claims, 7 Drawing Sheets

(56) References Cited

U.S. PATENT DOCUMENTS

| | | | |
|---|---|---|---|
| 7,681,907 B2 * | 3/2010 | Svenbrant et al. | 280/728.2 |
| 2003/0178831 A1 * | 9/2003 | Roberts et al. | 280/743.1 |
| 2009/0001692 A1 * | 1/2009 | Denys et al. | 280/728.3 |
| 2009/0001695 A1 * | 1/2009 | Suzuki et al. | 280/730.2 |

FOREIGN PATENT DOCUMENTS

| | | | |
|---|---|---|---|
| DE | 102006051553 | * | 5/2008 |
| JP | 5-42001 | | 6/1993 |
| JP | 6-227348 | | 8/1994 |
| JP | 07329688 A | * | 12/1995 |
| JP | 9-86329 | | 3/1997 |
| JP | 10-76903 | | 3/1998 |
| JP | 11342827 A | * | 12/1999 |
| JP | 2000-255369 | | 9/2000 |
| JP | 2005-186886 A | * | 7/2005 |
| JP | 2007-176353 | | 7/2007 |

OTHER PUBLICATIONS

English translation of JP 11-342827.*
English translation of JP 07-329688.*

* cited by examiner

SIDE AIRBAG DEVICE

TECHNICAL FIELD

The present invention relates to a side airbag device, the device including an airbag that is disposed in a folded state in an inside part of a vehicle body and is expanded by gas supplied from an inflator and deployed in a fore-and-aft direction of the vehicle body between a vehicle body inside face and an occupant.

BACKGROUND ART

In a side airbag device for protecting an occupant from the impact of a side collision by deploying an airbag 11 in a fore-and-aft direction of the vehicle body from a door inner face between the inner face and the occupant, an arrangement in which the airbag 11 is formed by stitching outer peripheral parts of a window side reinforcing fabric 14, an occupant side first cut fabric 15, and a second cut fabric 16 sandwiched therebetween, an airbag main body 12 is formed by the first cut fabric 15 and the second cut fabric 16, a space 19 is formed between the reinforcing fabric 14 and the second cut fabric 16, and the interior of the airbag main body 12 and the space 19 communicate via a vent hole 20 formed in a central part of the second cut fabric 16 is known from Patent Document 1 below.

In accordance with this side airbag device, when the airbag main body 12 is deployed by gas generated by an inflator 17, part of the gas passes through the vent hole 20 formed in the central part of the second cut fabric 16 and makes the space 19 expand, and it is thus possible to protect the airbag main body 12 even if broken window glass pieces scattered by the impact of a side collision damage the reinforcing fabric 14.

Patent Document 1: Japanese Patent Application Laid-open No. 10-76903

DISCLOSURE OF THE INVENTION

Problems to be Solved by the Invention

In the above-mentioned arrangement, during the process of deploying the airbag main body 12 by gas generated by the inflator 17, before deployment of the airbag main body 12 is completed, the gas of the airbag main body 12 passes through the vent hole 20 formed in the central part of the second cut fabric 16 and flows into the space 19, and there is therefore a possibility of delay in timing of the completion of deployment of the airbag main body 12, thus making it impossible for an effective occupant restraining force to be exhibited.

Furthermore, if the airbag of the side airbag device is formed from one chamber, without division into two chambers, when the airbag passes through a confined gap between the door and an occupant and is deployed in the fore-and-aft direction of the vehicle body, there is a possibility of the airbag interfering with the occupant to thus prevent smooth deployment. This problem may be solved by reducing the thickness in the vehicle width direction of the airbag after deployment is completed, but this is accompanied by the problem that the performance in protecting the occupant from a side collision is degraded.

The present invention has been accomplished in light of the above-mentioned circumstances, and it is an object thereof to enable rapid and reliable deployment of an airbag in a side airbag device for a side collision while ensuring that there is sufficient occupant restraint performance.

Means for Solving the Problems

In order to attain the above object, according to a first aspect of the present invention, there is provided a side airbag device comprising an airbag that is disposed in a folded state in an inside part of a vehicle body, and is expanded by gas supplied from an inflator and deployed in a fore-and-aft direction of the vehicle body between a vehicle body inside face and an occupant, characterized in that the airbag comprises a first base fabric disposed on the occupant side in a vehicle width direction, a second base fabric disposed on the vehicle body inside face side in the vehicle width direction, a third base fabric sandwiched between the first and second base fabrics, a first bag half body formed from the first base fabric and the third base fabric, a second bag half body formed from the second base fabric and the third base fabric and connected to the inflator, and a through hole that is formed in an end part of the third base fabric on the side distant from the inflator and that provides communication between the first and second bag half bodies.

Further, according to a second aspect of the present invention, in addition to the first aspect, the second base fabric and the third base fabric are joined via a joining part at a position on the inflator side relative to the through hole, and the joining part is broken by an increase in the internal pressure of the second bag half body due to gas supplied from the inflator.

Furthermore, according to a third aspect of the present invention, in addition to the first or second aspect, the through hole is closed by a base fabric piece, and closure of the through hole by the base fabric piece is released by deployment of the second bag half body progressing.

Stitching S2 of an embodiment corresponds to the joining part of the present invention.

Effects of the Invention

In accordance with the first aspect of the present invention, since the first bag half body is formed between the first base fabric and the third base fabric and the second bag half body is formed between the second base fabric and the third base fabric from the first base fabric disposed on the occupant side in the vehicle width direction, the second base fabric disposed on the vehicle body inside face side in the vehicle width direction, and the third base fabric sandwiched between the first and second base fabrics, and gas supplied from the inflator to the second bag half body is supplied to the first bag half body via the through hole formed in the end part of the third base fabric that is on the side distant from the inflator, after the second bag half body on the vehicle body inside face side is rapidly deployed to ensure that there is the minimum necessary occupant restraint performance, the first airbag half body on the occupant side is deployed, thereby sufficiently enhancing occupant restraint performance. When the second airbag half body is deployed, due to the thickness thereof in the vehicle width direction being small, smooth deployment is possible without interfering with the occupant, and subsequently when deployment of the first airbag half body is completed it is possible to protect the occupant effectively by ensuring that the thickness in the vehicle width direction of the entire airbag is sufficient.

Furthermore, in accordance with the second aspect of the present invention, since the second base fabric and the third base fabric are stitched at a position closer to the inflator than to the through hole, and the stitching is broken by gas supplied from the inflator to the second bag half body, after the second bag half body is rapidly deployed in the vehicle width direction in a region from the inflator to the end part of the stitching that is the closest to the inflator to thus ensure occupant restraint performance, the entire second bag half body is deployed accompanying breaking of the stitching, thereby enlarging the region where the occupant can be restrained.

Moreover, in accordance with the third aspect of the present invention, since the through hole is blocked by the base fabric piece, and blockage of the through hole by the base fabric piece is released by deployment of the second bag half body progressing, blocking the through hole by the base fabric piece during the initial stage of deployment of the airbag prevents gas from leaking from the second bag half body to the first bag half body, thereby enabling rapid deployment of the second bag half body, and supplying gas from the second bag half body to the first bag half body during the later stage of deployment of the airbag via the opened through hole enables the first bag half body to be deployed without problems.

EXPLANATION OF REFERENCE NUMERALS AND SYMBOLS

Figure 1:
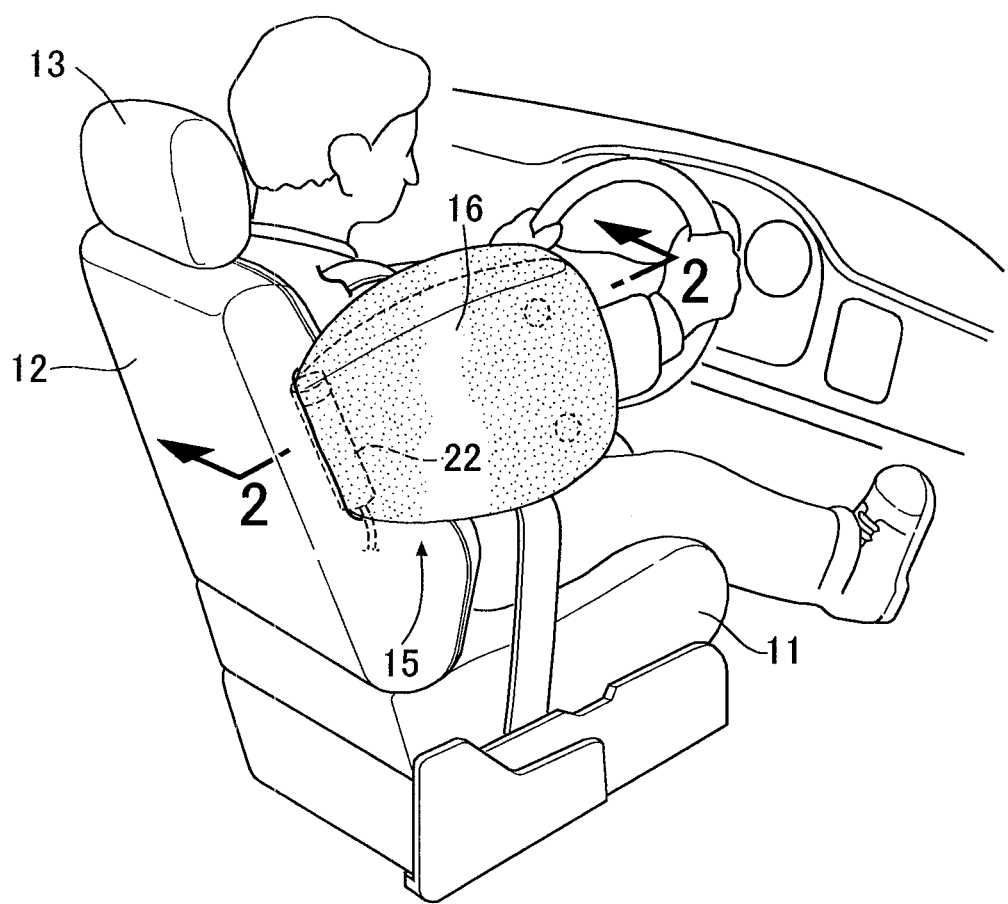
FIG. 1 is a diagram showing a state in which a side airbag device for an automobile driver's seat related to a first embodiment is operated. (first embodiment)

16 Airbag
17 First base fabric
18 Second base fabric
19 Third base fabric
19a Through hole
20 First bag half body
21 Second bag half body
22 Inflator
23 Base fabric piece
S1 Joining part

BEST MODE FOR CARRYING OUT THE INVENTION

Modes for carrying out the present invention are explained below by reference to the attached drawings.
First Embodiment FIG. 1 to FIG. 5 show a first embodiment of the present invention.

As shown in FIG. 1, a driver's seat of an automobile includes a seat cushion 11, a seat back 12, and a head rest 13; when the vehicle is involved in a side collision an airbag 16 of a side airbag device 15 embedded in a folded state in a side face of the seat back 12 on a door 14 (see FIG. 2) side breaks a stitching part of a skin of the seat back 12 and is deployed to the front of the vehicle body so as to be a barrier between the door 14 and an occupant, thereby protecting the occupant from a collision load applied to an outer face of the door 14.

Figure 2:
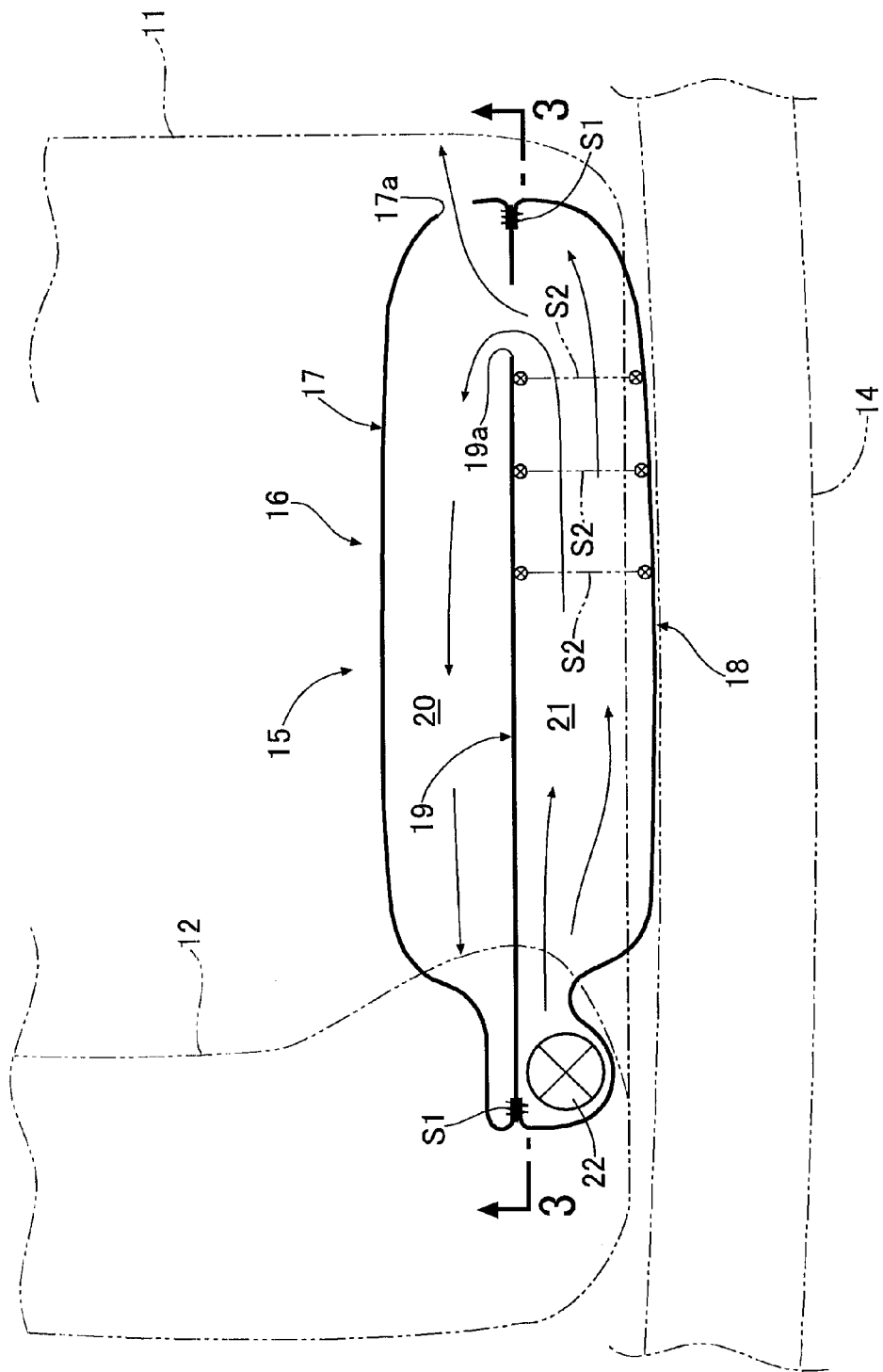
FIG. 2 is an enlarged sectional view along line 2-2 in FIG. 1. (first embodiment)
Figure 3:
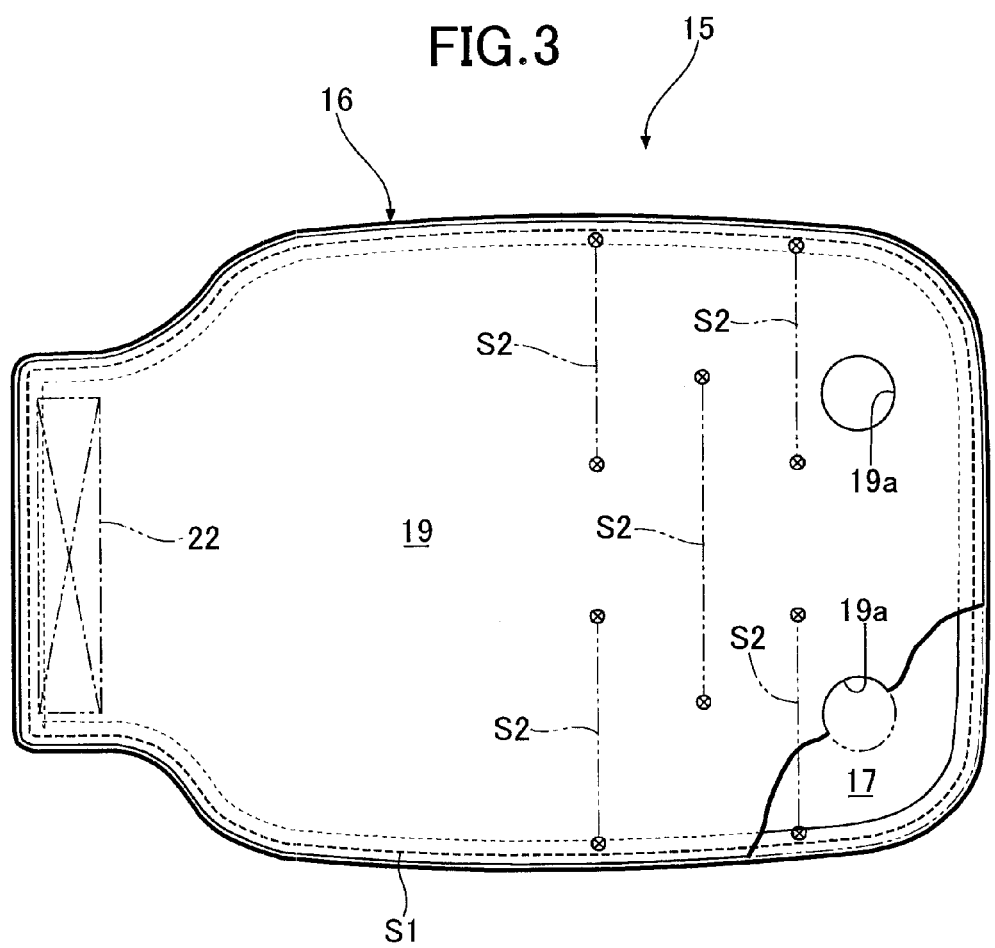
FIG. 3 is a sectional view along line 3-3 in FIG. 2. (first embodiment)
Figure 4:
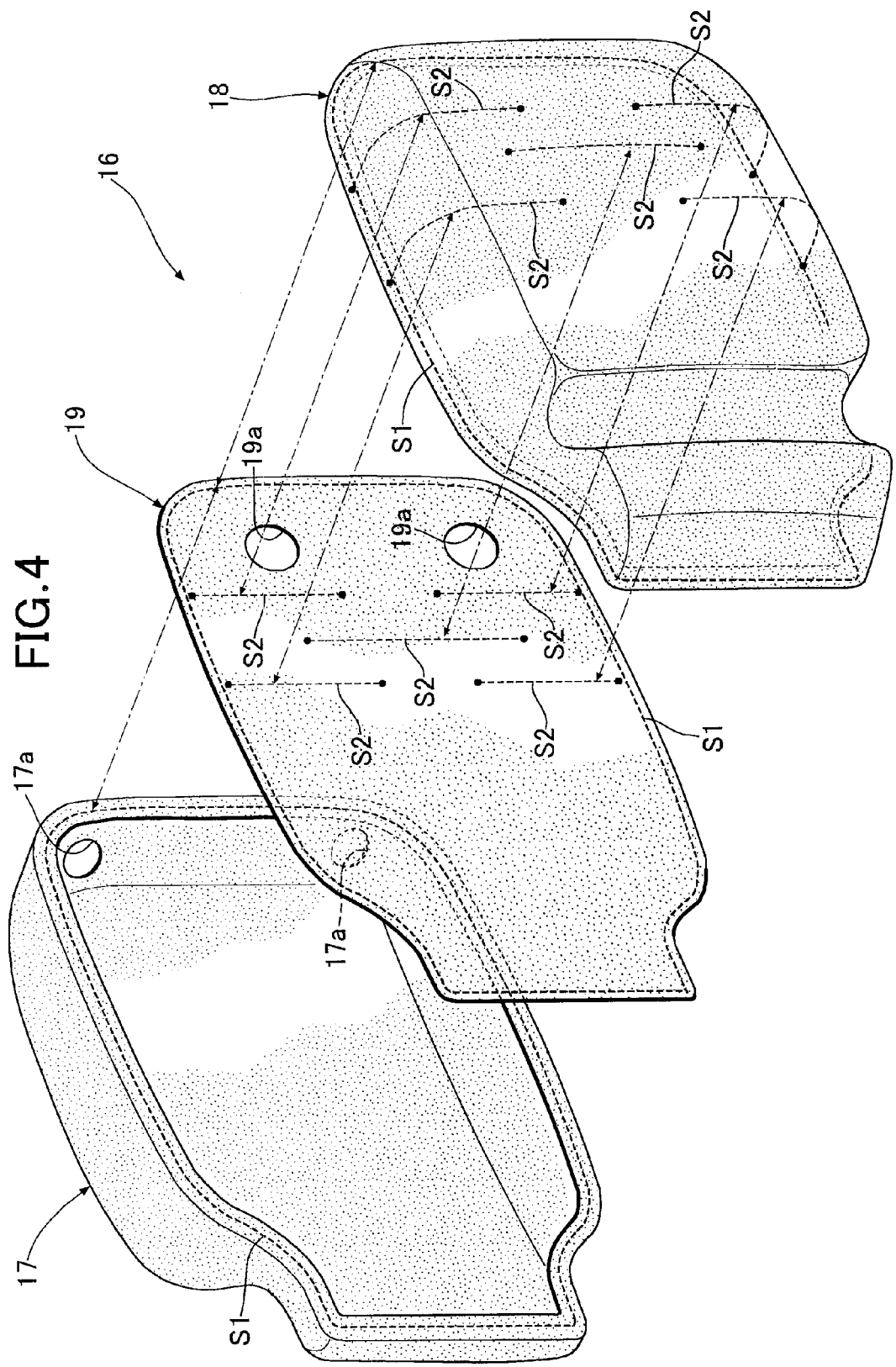
FIG. 4 is an exploded perspective view of base fabrics for an airbag. (first embodiment)

As shown in FIG. 2 to FIG. 4, with regard to the airbag 16, a first base fabric 17 positioned on the occupant side, a second base fabric 18 positioned on the door 14 side, and a third base fabric 19 sandwiched between the first and second base fabrics 17 and 18 are superimposed, and outer peripheral parts thereof are stitched with unbreakable stitching 51; a first bag half body 20 positioned on the occupant side is formed from the first base fabric 17 and the third base fabric 19, and a second bag half body 21 positioned on the door 14 side is formed from the second base fabric 18 and the third base fabric 19. An inflator 22 that generates gas for deploying the airbag 16 by combustion of a propellant is housed in a rear end part of the second bag half body 21, and the inflator 22 and the airbag 16 in the folded state are housed inside the skin of the seat back 12.

Opening in the vicinity of a front end part of the first base fabric 17 are, for example, two vent holes 17a and 17a, and opening in the vicinity of a front end part of the third base fabric 19 are, for example, two through holes 19a and 19a. The vent holes 17a and 17a provide communication between an internal space of the first bag half body 20 and the atmosphere, and the through holes 19a and 19a provide mutual communication between the first bag half body 20 and the second bag half body 21. Furthermore, the second base fabric 18 and the third base fabric 10 are breakably stitched between the inflator 22 and the through holes 19a and 19a along a plurality of vertically extending stitching lines S2. These stitching lines are disposed in a zigzag shape so that the inflator 22 and the through holes 19a and 19a do not communicate directly.

The operation of the first embodiment of the present invention having the above-mentioned arrangement is now explained.

When the vehicle is involved in a side collision and a predetermined value or greater of collision acceleration is detected, the inflator 22 is operated, gas is supplied to the second bag half body 21 on the door 14 side of the airbag 16, the skin of the seat back 12 is broken by the pressure of the expanding second bag half body 21, and an opening formed therein allows the airbag 16 to be deployed toward the front of the vehicle body.

Figure 5:
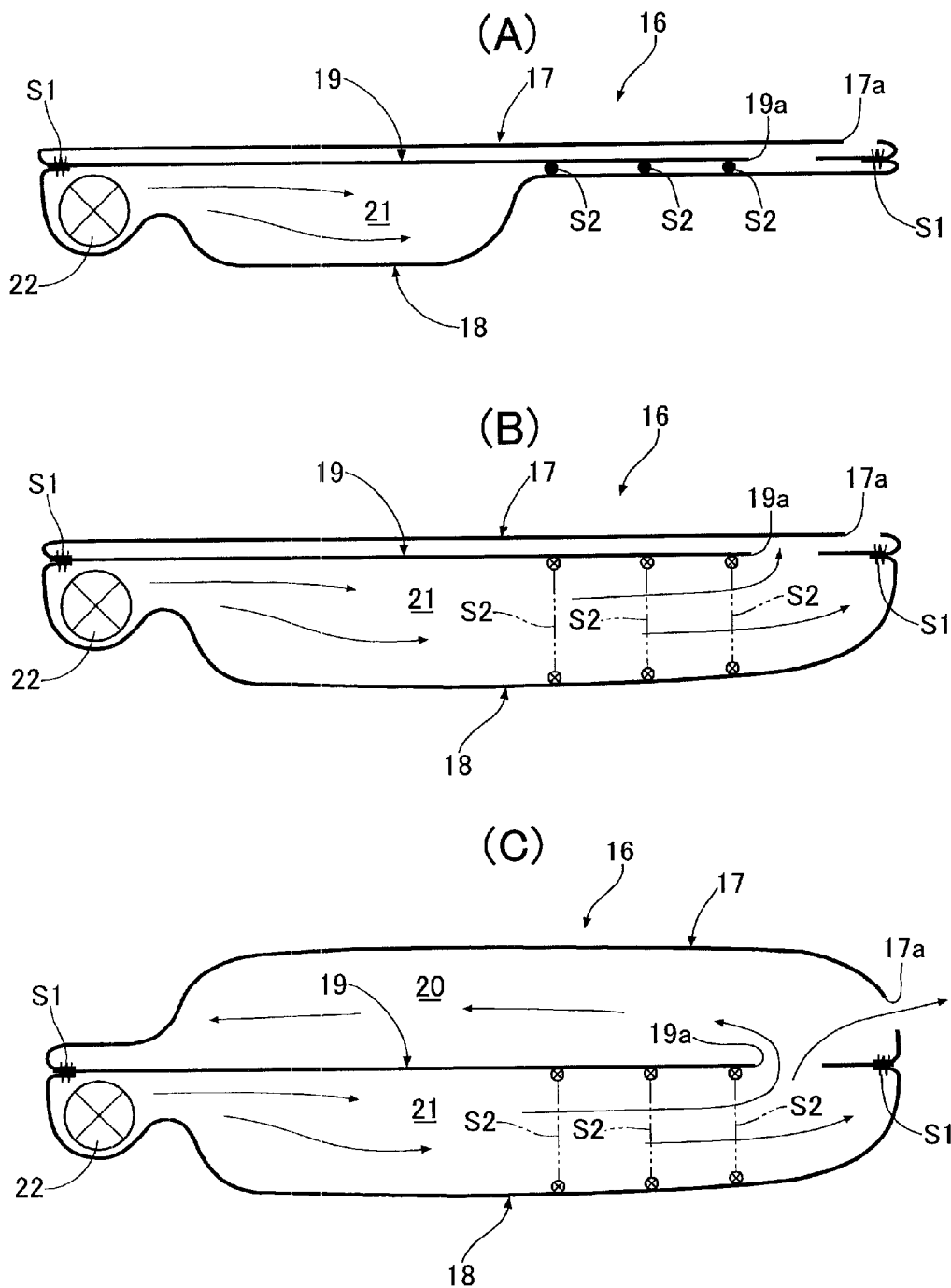
FIG. 5 is a diagram for explaining an airbag deployment process. (first embodiment)

In this process, gas generated by the inflator 22 firstly makes the second bag half body 21 on the door 14 side expand from its rear side to its front side, but since the second base fabric 18 and the third base fabric 19 forming the second bag half body 21 are stitched in a labyrinth shape by means of the stitchings S2, gas emitted from the inflator 22 cannot immediately reach the through holes 19a and 19a, and rapidly deploys a region sandwiched between the inflator 22 and rear ends of the stitchings S2 (see FIG. 5 (A)). As a result, the minimum necessary occupant restraining force can be generated against a collision load heading from the door 14 toward the compartment.

When the internal pressure of the rear half of the second bag half body 21 sandwiched between the inflator 22 and the rear ends of the stitchings S2 increases sufficiently, since the labyrinth-shaped stitchings S2 increase in tension, the stitchings S2 are broken in sequence from the rear side toward the front side, thus allowing the entire second bag half body 21 to be deployed and thereby protecting the occupant by broadly covering the right side face thereof (see FIG. 5 (B)).

When the second bag half body 21 is deployed in this way, the through holes 19a and 19a of the third base fabric 19 open, gas of the second bag half body 21 passes through the through holes 19a and 19a and flows into the first bag half body 20, and the first bag half body 20 is deployed later than the second bag half body 21. After the entire airbag 16 is completely deployed, surplus gas is discharged outside through the vent holes 17*a* and 17*a* of the first base fabric 17, and excessive increase in the internal pressure of the airbag 16 can be suppressed (see FIG. 5 (C)).

When the airbag 16 is deployed from the side face of the seat back 12 toward the front of the vehicle body at the time of a side collision, among the first and second bag half bodies 20 and 21, only the second bag half body 21 is first deployed, and the airbag 16 can therefore be deployed reliably without interfering with the occupant in a confined gap between the door 14 and the occupant. When deployment of the first bag half body 20 is completed after deployment of the second bag half body 21 is completed, the thickness of the airbag 16 in the vehicle width direction becomes the sum of the thicknesses of the first and second bag half bodies 20 and 21, and the occupant can be reliably protected from impact of a side collision. Here, the thicknesses of the first and second bag half bodies 20 and 21 may be made different by restricting them by means of a tether, etc.

Second Embodiment

Figure 6:
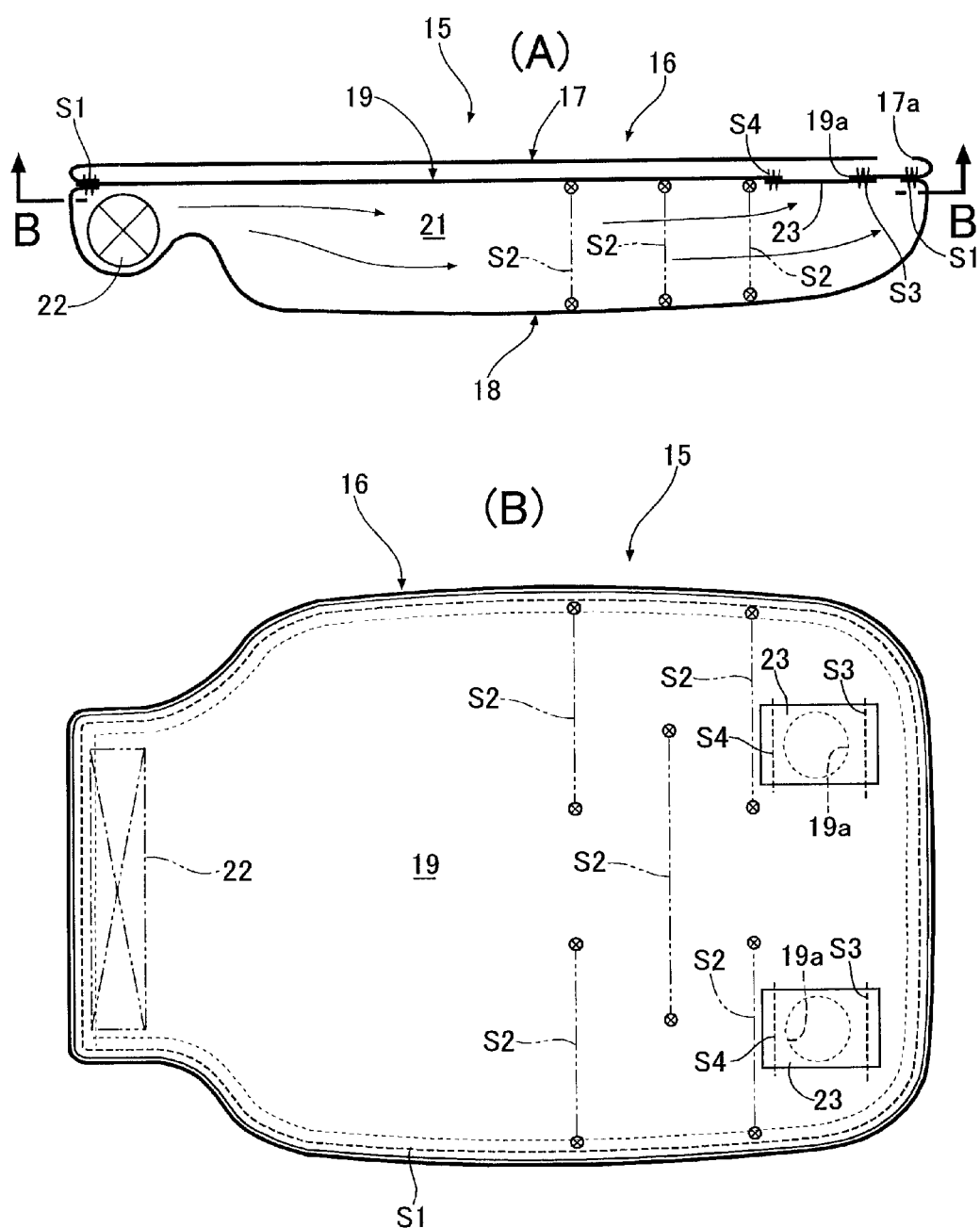
FIG. 6 is a diagram, related to a second embodiment, showing a state before a through hole of a third base fabric is opened. (second embodiment)
Figure 7:
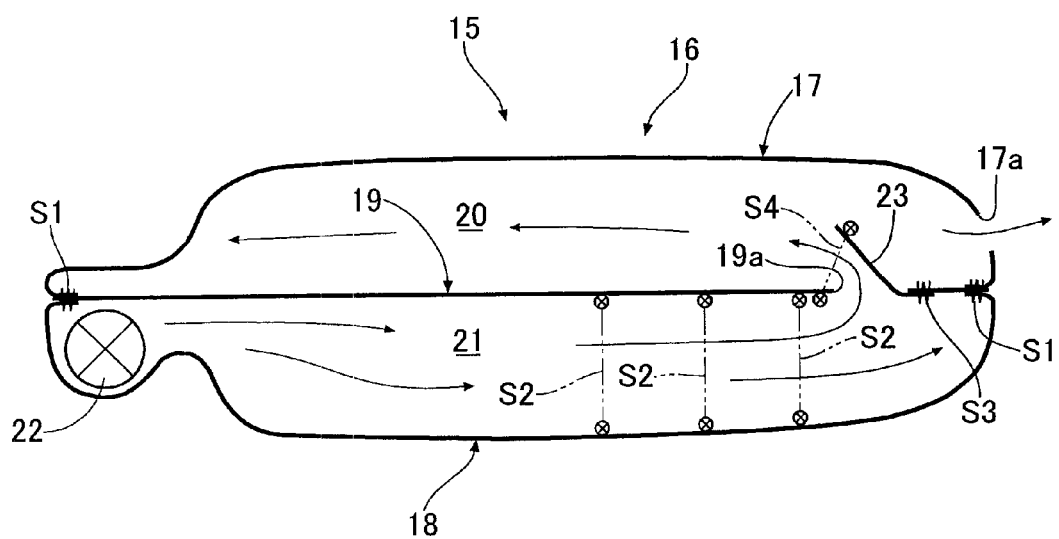
FIG. 7 is a diagram showing a state after the through hole of the third base fabric is opened. (second embodiment)

FIG. 6 and FIG. 7 show a second embodiment of the present invention.

In the first embodiment the through holes 19*a* and 19*a* are always open, whereas in the second embodiment through holes 19*a* and 19*a* are closed by base fabric pieces 23 and 23, and the through holes 19*a* and 19*a* open when the internal pressure of a second bag half body 21 becomes a predetermined value or greater.

That is, faces of the through holes 19*a* and 19*a* of a third base fabric 19 on a second base fabric 18 side are covered by the base fabric pieces 23 and 23, front end sides of the base fabric pieces 23 and 23 are stitched with unbreakable stitching S3, and rear end sides are stitched to the second base fabric 18 and the third base fabric 19 with breakable stitching S4. The position of the stitching S4 is positioned further forward than the front ends of the stitchings is S2.

In accordance with this second embodiment, while breaking of the stitchings S2 progresses in the process of the second bag half body 21 being deployed, the through holes 19*a* and 19*a* are covered by the base fabric pieces 23 and 23, gas does not flow from the second bag half body 21 side to a first bag half body 20 side, and rapid deployment of the second bag half body 21 is therefore further promoted. When the stitchings S2 are completely broken, the stitching S4, which is breakable, on the rear end sides of the base fabric pieces 23 and 23 breaks, the base fabric pieces 23 and 23 pass through the through holes 19*a* and 19*a* and are pushed out toward the first bag half body 20 side, gas flows from the second bag half body 21 to the first bag half body 20 via the through holes 19*a* and 19*a*, which are opened as a result of the above, and the first bag half body 20 can be deployed without problems.

Embodiments of the present invention are explained above, but the present invention may be modified in a variety of ways as long as the modifications do not depart from the spirit and scope thereof.

For example, in the embodiments, a side airbag device for a driver's seat is explained, but the present invention may be applied to a side airbag device for a passenger's seat or a rear seat.

Furthermore, in the embodiments, the airbag 16 is deployed from the side face of the seat back 12, but it may be deployed from a side face of a door on the vehicle compartment side or a pillar.

Moreover, two sheets of base fabric may be joined by adhesion or weaving instead of the stitchings S1 to S4. In this case, changing the joining strength can form a breakable joining part and an unbreakable joining part.

The invention claimed is:

1. A side airbag device comprising an airbag that is disposed in a folded state in an inside part of a vehicle body, and is expanded by gas supplied from an inflator and deployed in a fore-and-aft direction of the vehicle body between a vehicle body inside face and an occupant, wherein the airbag comprises a first base fabric disposed on the occupant side in a vehicle width direction, a second base fabric disposed on the vehicle body inside face side in the vehicle width direction, a third base fabric sandwiched between the first and second base fabrics, a first bag half body formed from the first base fabric and the third base fabric, a second bag half body formed from the second base fabric and the third base fabric and connected to the inflator, and a through hole that is formed in an end part of the third base fabric on the side distant from the inflator and that provides communication between the first and second bag half bodies;

wherein the second base fabric and the third base fabric are joined via a joining part at a position on the inflator side relative to the through hole, and the joining part is broken by an increase in the internal pressure of the second bag half body due to gas supplied from the inflator; and, wherein the joining part is provided by breakable stitching, the breakable stitching being formed in a labyrinth shape such that gas emitted from the inflator cannot immediately reach the through hole.

2. The side airbag device according to claim 1, wherein the airbag has a length dimension extending in the fore and aft direction and a width direction extending transverse to the length dimension, and wherein the breakable stitching extends part way across the airbag in the width direction.

3. The side airbag device according to claim 1, wherein the second bag half body has a first half and a second half, said first half being relatively closer to the through hole and the second half being relatively farther from the through hole, and wherein the joining part is disposed only in said first half of the second bag half body.

4. A side airbag device comprising an airbag that is disposed in a folded state in an inside part of a vehicle body, and is expanded by gas supplied from an inflator and deployed in a fore-and-aft direction of the vehicle body between a vehicle body inside face and an occupant, wherein the airbag comprises a first base fabric disposed on the occupant side in a vehicle width direction, a second base fabric disposed on the vehicle body inside face side in the vehicle width direction, a third base fabric sandwiched between the first and second base fabrics, a first bag half body formed from the first base fabric and the third base fabric, a second bag half body formed from the second base fabric and the third base fabric and connected to the inflator, and a through hole that is formed in an end part of the third base fabric on the side distant from the inflator and that provides communication between the first and second bag half bodies;

wherein the second base fabric and the third base fabric are joined via a joining part at a position on the inflator side relative to the through hole, and the joining part is broken by an increase in the internal pressure of the second bag half body due to gas supplied from the inflator;

wherein the through hole is closed by a base fabric piece, and closure of the through hole by the base fabric piece is released by deployment of the second bag half body progressing; and, wherein the joining part is provided by breakable stitching, the breakable stitching being formed in a labyrinth shape such that gas emitted from the inflator cannot immediately reach the through hole.

5. The side airbag device according to claim 4, wherein the airbag has a length dimension extending in the fore and aft direction and a width direction extending transverse to the length dimension, and wherein the breakable stitching extends part way across the airbag in the width direction.

6. The side airbag device according to claim 4, wherein the second bag half body has a first half and a second half, said first half being relatively closer to the through hole and the second half being relatively farther from the through hole, and wherein the joining part is disposed only in said first half of the second bag half body.

* * * * *